(No Model.) 4 Sheets—Sheet 1.

H. B. MURDOCK.
BICYCLE.

No. 463,703. Patented Nov. 24, 1891.

WITNESSES
F. Clough.
A. Cunningham.

INVENTOR
Horace B. Murdock
By W. W. Leggett,
Attorney.

(No Model.) 4 Sheets—Sheet 2.
H. B. MURDOCK.
BICYCLE.
No. 463,703. Patented Nov. 24, 1891.
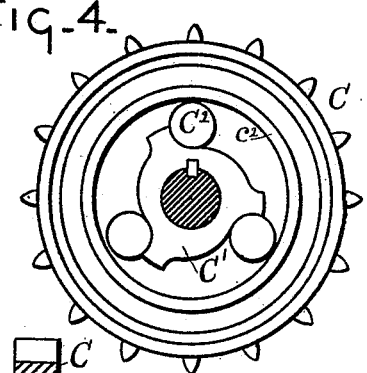
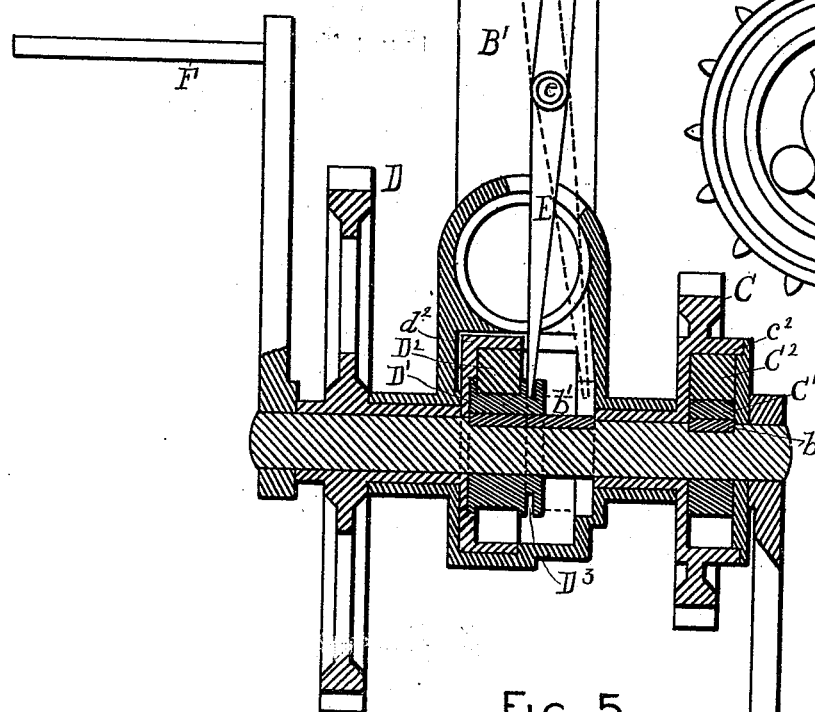
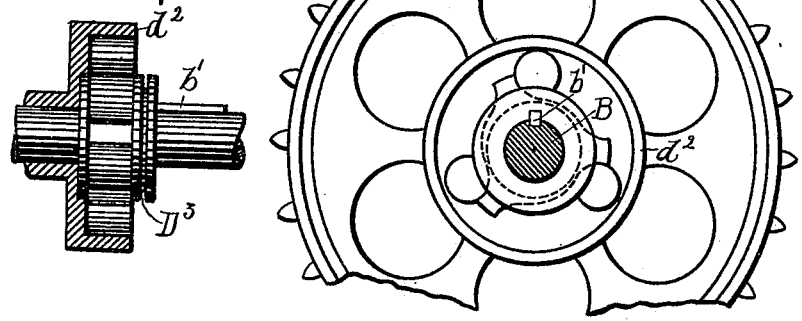
WITNESSES
F. Clough.
F. P. Haines
INVENTOR
Horace B. Murdock
By W. W. Leggett
Attorney.

(No Model.) 4 Sheets—Sheet 3.
H. B. MURDOCK.
BICYCLE.
No. 463,703. Patented Nov. 24, 1891.
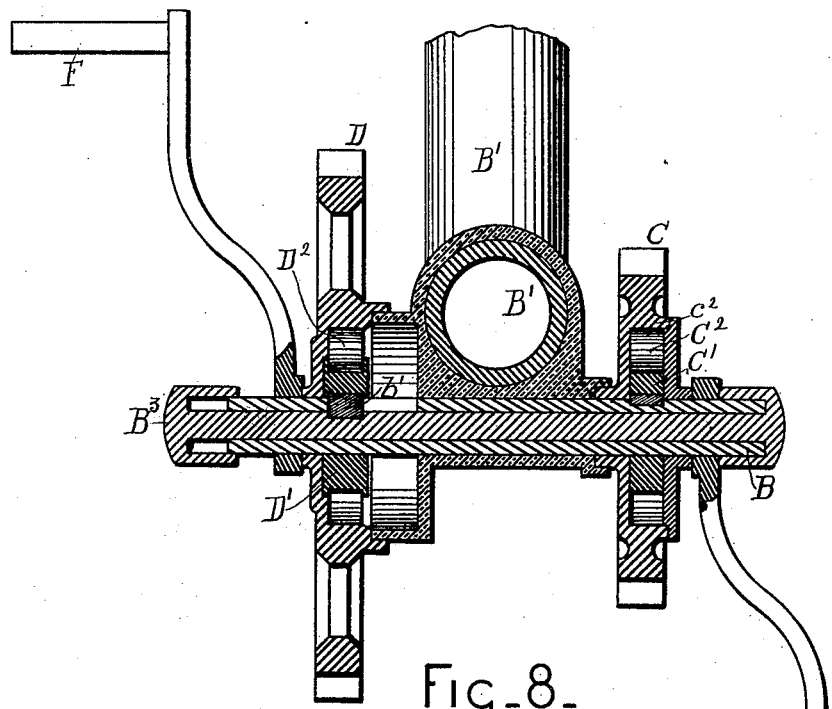
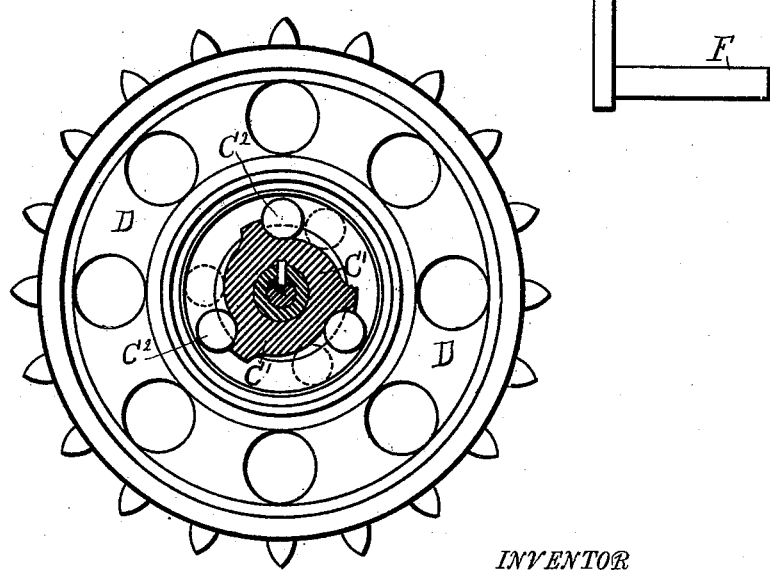
WITNESSES
F. Clough.
F. P. Haines
INVENTOR
Horace B. Murdock,
By W. W. Leggett.
Attorney.
THE NORRIS PETERS CO., PHOTO-LITHO., WASHINGTON, D. C.

(No Model.) 4 Sheets—Sheet 4.
H. B. MURDOCK.
BICYCLE.
No. 463,703. Patented Nov. 24, 1891.
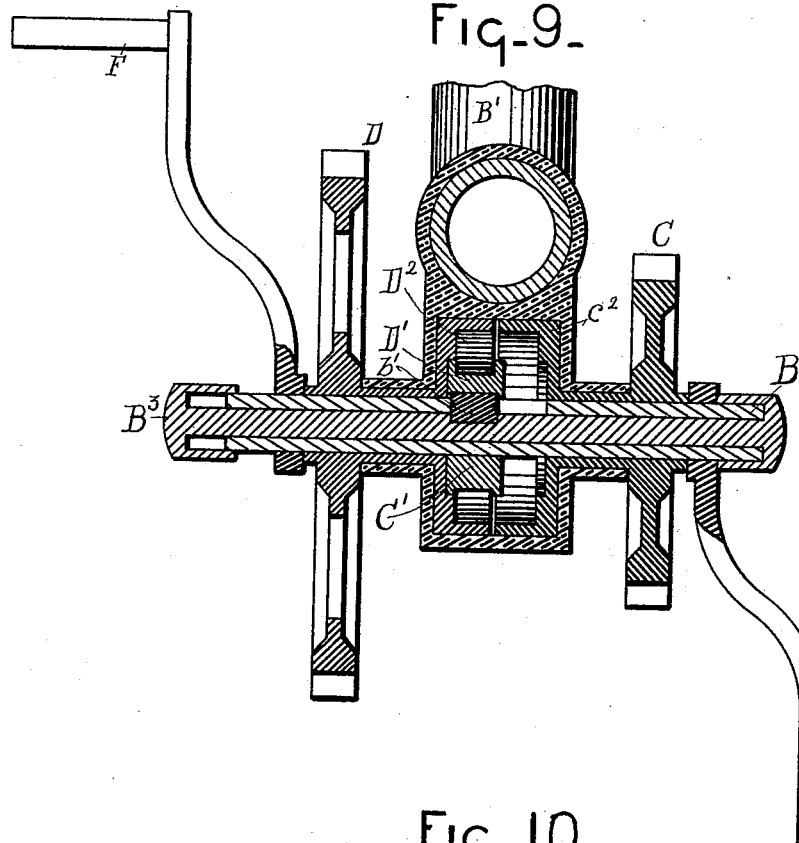
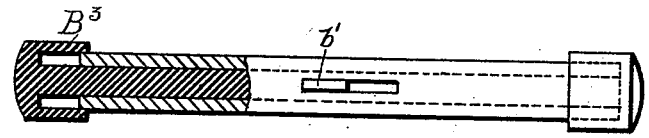
WITNESSES
F. Clough.
F. P. Haines.
INVENTOR
Horace B. Murdock
By M. W. Leggett,
Attorney
THE NORRIS PETERS CO., PHOTO-LITHO., WASHINGTON, D. C.

UNITED STATES PATENT OFFICE.

HORACE B. MURDOCK, OF DETROIT, MICHIGAN, ASSIGNOR OF TWO-THIRDS TO A. C. BISHOP AND C. E. RICHMOND, BOTH OF SAME PLACE.

BICYCLE.

SPECIFICATION forming part of Letters Patent No. 463,703, dated November 24, 1891.

Application filed February 28, 1891. Serial No. 383,190. (No model.)

*To all whom it may concern:*

Be it known that I, HORACE B. MURDOCK, a citizen of the United States, residing at Detroit, county of Wayne, State of Michigan, have invented a certain new and useful Improvement in Bicycles; and I declare the following to be a full, clear, and exact description of the same, such as will enable others skilled in the art to which it pertains to make and use the same, reference being had to the accompanying drawings, which form a part of this specification.

Figure 1:
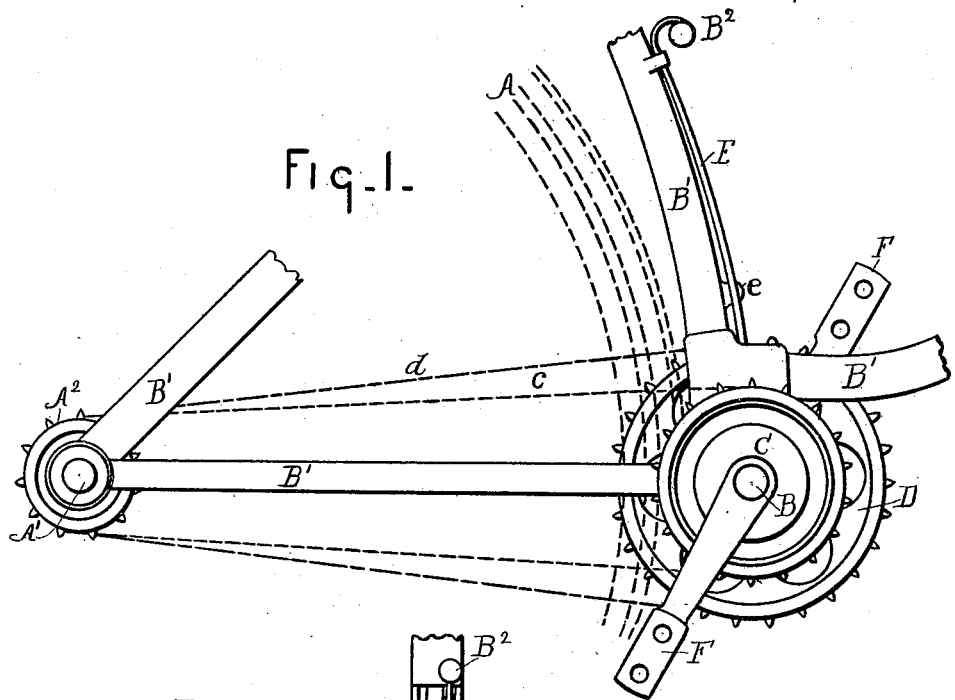
Figure 2:
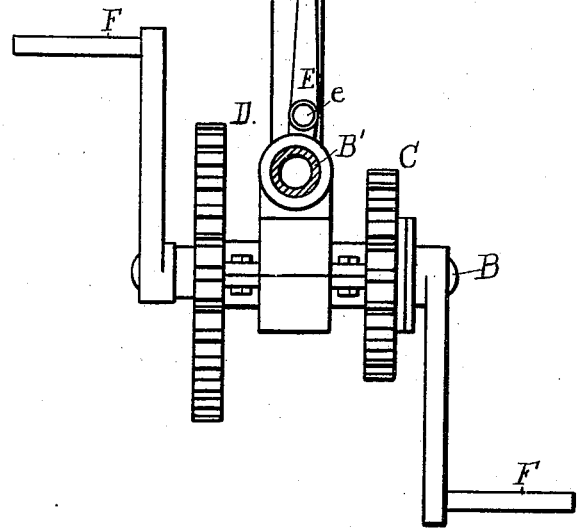

In the drawings, Figure 1 is a partial view in side elevation of a portion of a velocipede, showing the periphery of the driven wheel in dotted lines with my improvement attached. Fig. 2 is an end elevation of the driving mechanism embodying my improvement. Fig. 3 is a vertical section through the drive-shaft and illustrating, partly in elevation, my improvements. Fig. 4 is a separate view of the ordinary or slow-speed sprocket-gear and its connections with the drive-shaft. Fig. 5 shows the high-speed sprocket-gear and illustrates the relative mechanism whereby it is engaged with the drive-shaft. Fig. 6 is a view in section and elevation of the clutch-collar and friction-rollers, showing how the same are shifted into and out of gear with the high-speed sprocket-gear. Figs. 7, 8, 9, and 10 show modifications of the arrangement of the clutch and shifting device.

In velocipedes, bicycles, tricycles, and the like, where the propelling power is the foot operating upon propelling-cranks, a speed is acquired due to the rapidity with which the operator may operate his feet. On the other hand, when under speed the muscular exertion expended in propelling the cranks is little as compared with the effort expended by the rapid flexure of the legs at the knees. If, therefore, means could be provided whereby the rider, having attained a high speed, could alter the gear so as to maintain the said speed with a slower movement of his legs, he could accomplish a certain distance with the expenditure of very much less energy; or, having thus attained as high speed as possible with his ordinary gear, he might by thus changing his gear continue to increase his speed until he might be exerting as rapid an action as before with his legs, while it might be quite impracticable to employ the said rapid gear at the time of starting or until a considerable speed had been acquired. To accomplish this in a practical manner it is necessary that the same should be done without any material shock or jar to the machine at the instant of changing from the slow-speed to the high-speed gearing.

It is the purpose of my invention to produce a mechanism which shall accomplish the foregoing object.

In carrying out my invention, A represents the periphery of the driven wheel, and A' its axle.

$A^2$ represents sprocket-wheels, one at each end of the hub, adapted to receive the chain belts $c$ and $d$.

B is the drive-shaft, supported in the usual way by suitable frame-work B'.

C is a sprocket-gear which engages with the chain belt $c$. It is sleeved loosely upon the drive-shaft B, and a cam-head C', keyed by a key $b$, is fastened rigidly to the shaft and located within the said sprocket-gear.

$C^2$ represents metallic rollers, preferably of steel, located in the recess between the cam-head C' and the inner periphery of the sprocket-wheel C. It is apparent from the shape of the cam-faces that the rollers $C^2$ will, when the drive-shaft B is turned in the direction of the arrow in Fig. 4, cause the rollers to bind against the inner periphery $c^2$ and carry the sprocket-gear C with it. On the other hand, should the rider desire to rest, and so stop the action of his feet, the sprocket-wheel C will continue to revolve, while the drive-shaft comes to rest, the small rollers $C^2$ rolling back into the position shown in Fig. 4, where they no longer serve to bind the shaft and sprocket-gear together.

D is a large sprocket-wheel. It is in like manner sleeved loosely upon the drive-shaft B, and is, like the wheel C, provided with a flange or periphery $d^2$.

D' is a cam-head engaged loosely with the shaft B and adapted to slide longitudinally of the shaft upon a spline $b'$. It is provided with cam-faces, as shown in Fig. 5, similar to those in Fig. 4, and with similar metallic rollers $D^2$.

$D^3$ is an annular groove, within which is engaged a shifting-lever E, pivoted at $e$ to the upright portion of the frame-work B' and provided with a convenient handle $B^2$ at its top, so that the rider may conveniently grasp the same and so shift the cam-head D'.

F represents the usual foot-cranks or propelling-cranks.

The operation of the device will now be understood. I will presume the rider about to start on his implement. The lever E will be in the position shown by dotted lines in Fig. 3 and the cam-head D' will be over at the right and out of action. He then starts his machine, using the cranks in the usual way. This turns the shaft in the direction of the arrow, as shown in Fig. 4, and causes the rollers $C^2$ to immediately engage the sprocket-gear C, and so, through the chain $c$ and its corresponding sprocket-wheel A', the implement is propelled forward. He may continue in this way; but should he desire to attain a high speed he will as soon as he has attained such speed as he can conveniently reach without too rapid action with his feet cease for an instant to propel the cranks. The implement will, however, continue to move onward, since the sprocket-gear C will overtake the shaft, and so roll the rollers $C^2$ out of engagement into the position shown by the full lines in Fig. 4. He then seizes the lever E and shifts the cam-head D' to the left into the position shown in Fig. 3. It will shift readily into place because the sprocket-gear D is moving more rapidly than the shaft, which will have a tendency to carry the rollers into their inactive position. (Shown in the full lines in Fig. 5.) Having thus shifted the said cam-head, he then proceeds again to propel the crank-shafts with his feet. As soon as he begins this action he thereby causes the sprocket-gear D to overtake and engage the drive-shaft B, and he has accomplished the change from the slow-speed gearing to the high-speed gearing without any danger of shock to the implement. It is now apparent that with this larger gear-wheel D each revolution of the propelling-cranks will cause the implement to move through a correspondingly greater distance. He may therefore increase the high speed which he had formerly attained to a very much higher speed before his feet acquire the same rapidity of action they had with the slow-speed gearing and without very material increase of exertion on his part. He may in like manner change from his high-speed gearing back to his low-speed gearing, should he desire to reduce his speed or in case he has to go up a hill. This device also affords an opportunity on a crank-propelled velocipede or similar implement for the rider to rest himself, since he may at any time stop the motion of the cranks without suddenly checking in any way the implement, and can subsequently resume his action in like manner without any sudden jar or shock. This mechanism admits of considerable variation without departing from my invention. Thus, as shown in Figs. 7, 8, 9, and 10, the lever E may be dispensed with, and in lieu thereof the device may be operated by thrusting a shaft to the right or left, the said shaft being concentric with the axis of the drive-shaft, and the particular location and construction of the shifting-clutch with respect to the sprocket-wheels may likewise be varied. Thus, in Fig. 7, $D^3$ may represent a shaft passing through the shaft B and adapted to be slid in a direction longitudinally of said shaft. The cam-head D' is keyed directly to this shifting-bar, so that when the rider with his foot forces the bar to the right or left this cam-head will be shifted out from or into engagement with the gear-wheel D. The remaining construction may, as shown in Fig. 7, be substantially the same as that shown in Fig. 3.

Another form of construction is shown in Fig. 9. The shifting-bar $B^3$ is arranged the same as before; but a single cam-head D', with its rollers, is employed for both sprocket-wheels, the same adapted to shift directly from the annular cavity where it engages the periphery $d'$ into an annular cavity where it may engage directly the periphery $c^2$ of the other wheel.

I would have it understood that my invention contemplates such variations in the construction as the foregoing.

What I claim is—

1. The combination, with a velocipede or similar implement, of a crank-propelled drive-shaft, a small slow-speed gear engaged with the shaft by a cam-head and rollers, as described, and a high-speed gear sleeved loosely on the shaft and in connection therewith a clutch adapted to slide longitudinally on the shaft and to revolve therewith, and means for shifting said clutch into and out from engagement with a high-speed gear, said clutch consisting of the head D' and rollers $D^2$, substantially as described.

2. The combination, with a velocipede or similar implement, of a crank-propelled drive-shaft, a slow-speed gear and a high-speed gear, both loosely journaled on said shaft, and a clutch adapted to slide longitudinally along said shaft and to revolve therewith, with means for actuating the same, said clutch consisting of a cam-head D', with rollers $D^2$, and adapted to be shifted out from engagement with one gear into engagement with the other gear, and vice versa, substantially as set forth.

3. The combination, with a velocipede or similar implement, of a crank-propelled drive-shaft, a small slow-speed gear and a large high-speed gear loosely sleeved thereon and engaged by chain belts, with sprocket-wheels upon the shaft of the driven wheel, engaging mechanism connected with the drive-shaft adapted to engage the slow-speed gear whenever the speed of the drive-shaft exceeds that of the gear, means for similarly engaging the high-speed gear, and exteriorly-projecting means for shifting said latter device into or out from juxtaposition with said gear by a limb of the operator, substantially as described.

4. The combination, with the drive-shaft and driven shaft of a velocipede or similar implement, of a small slow-speed sprocket-gear and a large high-speed sprocket-gear, both sleeved loosely upon the drive-shaft and engaged by chain belts with the driven shaft, and in connection therewith a cam-head C' and roller C², adapted to engage the slow-speed sprocket-gear whenever the drive-shaft has speed greater than the said gear, and a similar shifting cam-head and rollers adapted in like manner to engage the high-speed sprocket-gear, and exteriorly-projecting means for shifting the same by a limb of the operator, substantially as described.

5. The combination, with a velocipede or similar implement, of a crank-propelled shaft, a slow-speed gear and a high-speed gear, both loosely sleeved on said shaft and adapted to propel the vehicle, a shifting clutch upon the drive-shaft adapted to throw the high-speed gear into and out of engagement with said shaft, and a shifting-bar extending longitudinally through and out from the ends of said shaft and engaging said clutch, the construction being such that the clutch may be actuated by shifting said bar to the right or left by the feet of the rider, substantially as and for the purposes described.

In testimony whereof I sign this specification in the presence of two witnesses.

HORACE B. MURDOCK.

Witnesses:
W. H. CHAMBERLIN,
MARION A. REEVES.